United States Patent
Yaida et al.

[15] 3,639,905
[45] Feb. 1, 1972

[54] CREDIT CARD SYSTEM HAVING MEANS FOR SENSING IF OBJECT IS LIVING

[72] Inventors: Koichi Yaida, Osaka; Shizuya Ano, Kyoto, both of Japan

[73] Assignee: Omron Tateisi Electronics Co., Kyoto, Japan

[22] Filed: Nov. 27, 1970

[21] Appl. No.: 92,977

[52] U.S. Cl. .......................................340/149, 235/61.7
[51] Int. Cl. ...................................................H04q 3/00
[58] Field of Search ......................340/149 A, 149

[56] References Cited

UNITED STATES PATENTS 3,576,538  4/1971  Miller ...............................340/149 A

*Primary Examiner*—Harold I. Pitts
*Attorney*—Christensen, Sanborn & Matthews

[57] ABSTRACT

A system for identifying the user of a credit card or the like, wherein a predetermined portion of the living body, such as a finger or a hand, of the user of a card is used for identification of the user. The system is provided with means for checking whether the object presented by the user of a card is the predetermined portion of the living body of the user so that any fraudulent use of an object simulating the portion of a human body can be prevented.

6 Claims, 5 Drawing Figures

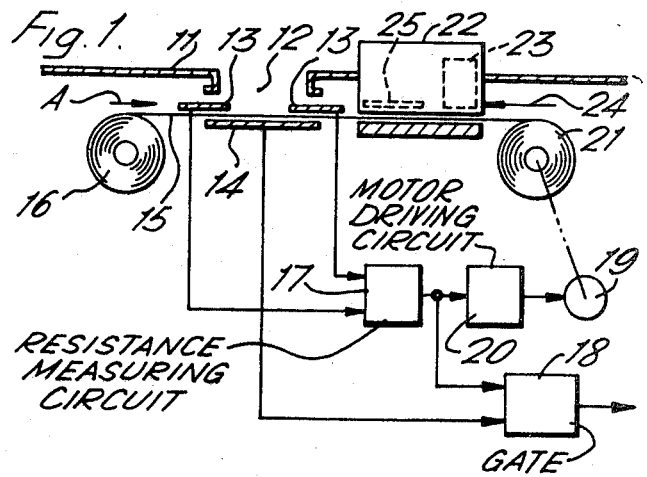
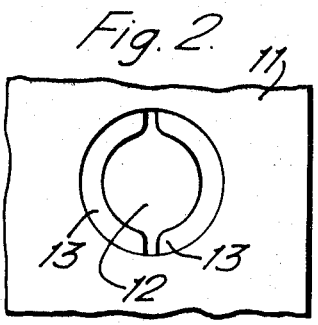
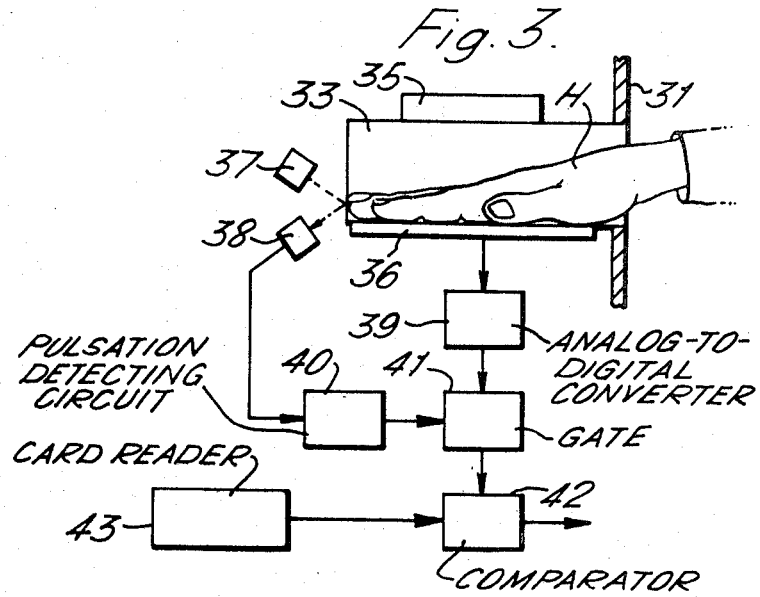

CREDIT CARD SYSTEM HAVING MEANS FOR SENSING IF OBJECT IS LIVING

This invention relates to a system for identifying the user of a credit card or the like.

In recent years credit cards or bank cards have been in wide use in various fields of our economic life, for example, to purchase articles of merchandise from shops or deposit or withdraw money from or to a bank. It is necessary to make some evidence of such transactions and it has hitherto been customary that the user of a card sign on a slip to serve as an evidence of the transaction. However, in transactions with an automatic vending machine or an automatic cash dispensing machine, it is impossible to check whether the user of a card has duly signed a slip or not. Instead of signature, a fingerprint of the user of a card may be used as an evidence of a transaction made with the card. Also, in order to check whether the card has been used by its proper owner or not, it has been proposed to identify the user of a card by means of the area of the palm or the characteristic of a fingerprint of the user. In this method, each card has recorded thereon the area of the palm or the characteristic feature of the fingerprint of a predetermined finger of the proper owner of the card, and the vending machine or cash dispensing machine is provided with means for measuring the area of the palm or check the characteristic of the fingerprint of each user of the machine, so that when a card has been used in the machine, the area of the palm or the characteristic of the fingerprint recorded on the card is collated with the area of the palm or the characteristic of the fingerprint actually presented by the user of the card, thereby determining whether the user of the card is its proper owner.

In the above-mentioned prior art methods, however, even when an object simulating the palm of fingerprint of the owner of a card is fraudulently used, a slip has been made as an evidence of the transaction, or the improper user of the card has been erroneously recognized as its proper owner.

Accordingly, the primary object of the invention is to provide an identification system which is capable of correctly identifying the user of a credit card or the like in an automatic vending machine or the like.

Another object of the invention is to provide such an identification system as aforesaid which is provided with means for checking whether the object presented by the user of a card for identification is predetermined portion of the living body of the user such as a hand or a finger.

Another object of the invention is to provide such an identification system as aforesaid wherein the checking means relies on the electrical resistance of the object presented by the user of a card for determining whether the object is a predetermined portion of the living body of the user.

Another object of the invention is to provide such an identification system as aforesaid wherein the checking means detects the pulsation of the object presented by the user of a card for determination of whether the object is the predetermined portion of the living body of the user.

Still another object of the invention is to provide such an identification system as aforesaid which is provided with means for taking a fingerprint of the user of a card of on a slip of paper to be kept as an evidence of the transaction.

A further object of the invention is to provide such an identification system as aforesaid which is provided with means for measuring the area of the palm of the user of a card for identification of the user.

The invention with its features and advantages will become apparent from the following description of some preferred embodiments thereof with reference to the accompanying drawings, wherein:

FIG. 1 is a diagram of one embodiment of the invention which is provided with means for taking a fingerprint of the user of a credit card or the like on a slip of pressure sensitive paper to serve as an evidence of the transaction;

FIG. 2 is a top plan view of the hole in FIG. 1 in which a predetermined finger of the user of a card is to be put;

FIG. 3 is a diagram of another embodiment of the invention wherein identification of the user of a card depends on the area of the palm of a hand of the user of a card;

Figure 4:
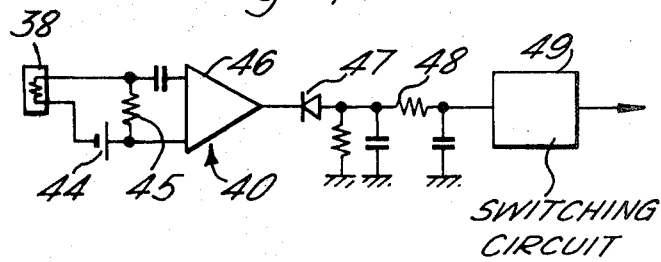
FIG. 4 is a detailed circuit diagram of a block in FIG. 3.

Referring to the drawings, first to FIG. 1, there is shown a casing wall 11 of, say, an automatic vending machine. In the casing wall 11 there is formed a circular window or hole 12 having a diameter just enough for a finger tip of a human being to be put into. Inside the window 12 of a pair of diametrically opposed electrodes 13 are disposed, beneath which a pressure sensitive plate 14 is positioned to form a bottom of the hole 12. A sheet of pressure sensitive paper 15 is withdrawn from a roll 16 and passed beneath the electrodes 13 and over the plate 14 to be wound onto a takeup roll 21.

When a user of the machine puts his or her finger tip into the hole 12, it contacts the two electrodes 13, whereupon the electrodes are connected via a resistance provided by the finger, so that a resistance measuring circuit 17 operates. The arrangement is such that without any finger interposed between the electrodes 13, the resistance therebetween is higher than 1 megohm and that when a metallic object is put between the electrodes, the resistance therebetween drops below 500 ohms. Therefore, when a resistance over 1 megohm is measured, it indicates that no finger is put into the hole 12, while when the resistance has dropped below 500 ohms, it indicates the presence of a metallic object between the electrodes 13. When a resistance as high as that of a human finger has been detected, the circuit 17 produces an output to be applied to a gate circuit 18 and a motor driving circuit 20.

When the user pressure his or her finger tip in the hole against the pressure sensitive paper 15, the fingerprint is recorded on the paper. At the same time, the pressure is applied to the pressure sensitive element 14, so that the element 14 produces an output to be applied to the gate circuit 18. When the gate 18 receives the signal from the circuit 17 and the signal from the element 14 at the same time, it produces an output. This output signal may be used to actuate, say, a control circuit not shown but provided in an automatic vending machine to control the dispensation of an article.

When the finger tip is withdrawn out of the hole 12, the signal from the circuit 17 disappears, whereupon the motor driving circuit 20 energizes a motor 19 to turn the roll 21 so that a length of the sheet of pressure sensitive paper 15 equal to just one slip is automatically wound onto the roll 21.

Before putting his or her finger tip into the hole 12, the user introduces his or her card 25 into the machine through an inlet slot not shown and the card is conveyed to a data printing device 22. The card has necessary information or data embossed thereon, and the embodiment is pressed against the pressure sensitive paper 15 by a well-known device, not shown, to transfer the data onto the paper. A date printer 23 is provided in the device 22 to which a signal is applied through a line 24, so that the printer 23 prints on the sheet of paper 15 the date on which the card is used. Thus, the paper 15 has recorded thereon the fingerprint of the user of the card as an evidence that the user has actually used the card and the date of the transaction and other necessary data.

Turning to FIG. 3 which shows an arrangement for identifying the owner of the card by the area of the palm of his or her hand, the machine has a front wall 31 in which a notch or recess 33 is formed. When using the machine, the user is requested to put his or her hand into the recess 33. A light source 35 is provided above the recess 33, the bottom wall of which is defined by a photosensitive device 36. Normally the source 35 projects light over the whole sensitive area of the device 36. When a hand is placed on the device, however, part of the light is intercepted by the hand, and it is possible to measure the area of the hand from the amount of light received by the device 36. The output from the device 36 corresponding to the amount of light it has received is converted by an analog-to-digital converter 39 to a digital value, which is applied to a gate circuit 41.

Another light source 37 is provided beyond the inner end of the recess 33 so that the light from the source 37 is projected onto the tip of a finger of the hand. The light reflected by the finger tip is received by a photosensor 38, which produces an output to be applied to a living body detector 40. As will be described later in detail, when the detector 40 has recognized the object in the recess 33 as a living object, it produces an output to be applied as a gate signal to the gate circuit 41, whereupon the output from the converter 39 is allowed to pass through the gate 41 to be applied as one input to a comparator 42. A card reader 43 reads the information on the card introduced into the machine. The information recorded on the card includes the area of the palm of a predetermined hand of the proper owner of the card, and the car reader applies a digital value corresponding to the area of the palm read from the card as the other input to the comparator 42. The comparator compares this digital value and the digital value from the converter 39, and if the two values are equal, the person which has his or her hand placed in the recess 33 is recognized as the proper owner of the card and the comparator 42 produces a corresponding output signal.

Since the hand placed in the recess 33 is a part of a living human body, it naturally has pulsation, so that the amount of light reflected by the finger tip varies at a frequency corresponding to the frequency of the pulsation as is well known in the technique of measuring pulsation. If any other thing than a living body is placed in the recess 33, no cyclic damage occurs in the amount of reflected light entering the photosensor 38. Therefore, by detecting whether the output from the photosensor 38 shows a predetermined cyclic change or not it is possible to determine whether the object placed in the recess 33 is a living body or not. The detector 40 is a pulsation detecting circuit for detecting the cyclic change of the output from the photosensor 38.

FIG. 4 shows a concrete circuit arrangement of the detector 40. The photosensor 38 is connected across a resistor 45 through an electric source 44. The voltage drop across the resistor 45 varies with the cyclic change of the amount of light received by the photosensor 38. The cyclic variation of the voltage drop is amplified by an alternating current amplifier 46. The output from the amplifier is rectified by a diode 47 and smoothed by a smoothing circuit 48 to be applied to a switching circuit 49. If there is no pulsating change in the amount of light received by the photosensor 38, there is no corresponding pulsating change in the output of the amplifier 46 so that the switching circuit 49 does not produce any output. On the contrary, if there is a pulsating change in the amount of light received by the photosensor 38, the amplifier 46 produces a corresponding pulsating output so that the circuit 49 produces an output to be applied as a gate signal to the gate circuit 41 in FIG. 3. Thus, it is possible to detect whether the object placed in the recess 33 is a hand of a living human body or not.

Instead of the area of the hand, the characteristic of the fingerprint of a predetermined one of the fingers of the user of a card may be used to identify the user by replacing the element 36 in FIG. 3 by a well-known fingerprint detector.

Figure 5:
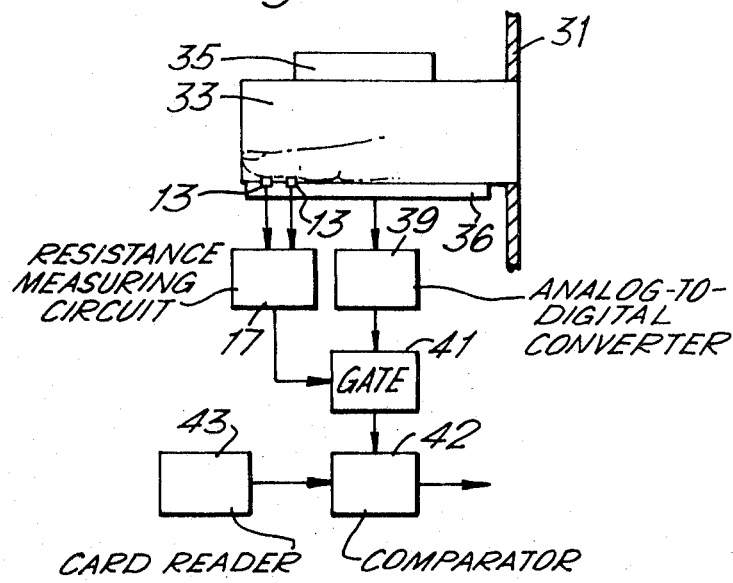
FIG. 5 is a diagram similar to FIG. 3 but showing a third embodiment of the invention.

Turning to FIG. 5 which shows a modification of the arrangement of FIG. 3, the same reference numerals in FIG. 5 as in the other figures denote corresponding parts. While in FIG. 3 pulsation is utilized to confirm the living human body, in FIG. 5 the electric resistance of the finger is utilized for the same purpose. To this end, near the inner end of the recess 33 a pair of spaced electrodes 13 are provided on the upper surface of the photosensitive device 36 so that when the hand is placed on the device 36, the tip of, say, the middle finger touches the two electrodes 13. The resistance between the electrodes is measured by the resistance measuring circuit 17 just as in FIG. 1 and when a resistance between 500 ohms and 1 megohm has been measured, the circuit 17 produces an output to be applied a gate signal to the gate 41. The operation of the other circuit elements in FIG. 5 is the same as in FIG. 3, so that no further description will be necessary.

What we claim is:

1. A system for identifying the user of a credit card and the like, comprising: means for receiving a predetermined portion of a living human body; means for checking whether an object presented by a user of a card for identification and received in said receiving means is said predetermined portion of a living human body to produce an output signal when said object is recognized as said predetermined portion; and means operable in response to said output signal to recognize said user as the proper owner of said credit card.

2. The system of claim 1, wherein said checking means relies on the electric resistance of said object received in said receiving means for determination of whether said object is said predetermined portion of a living human body.

3. The system of claim 1, wherein said checking means relies on the presence or absence of the pulsation of said object received in said receiving means for determination of whether said object is said predetermined portion of a living human body.

4. The system of claim 2, wherein said checking means includes a pair of spaced electrodes arranged to be connected via said object received in said receiving means and means for measuring the electrical resistance between said electrodes.

5. The system of claim 3, wherein said checking mans includes a source of light for projecting light onto said object received in said receiving means, a photosensor for receiving the light reflected by said object to produce an output corresponding to the amount of light received and means for detecting in said output a pulsating change corresponding to the pulsation of a living human body.

6. The system of claim 1, wherein said receiving means comprises a recess for receiving therein a hand of the user of the card; and said checking means comprises means for measuring the area of the palm of said hand, and means for comparing the measured area with that area of the palm of the proper owner of the card used which is previously recorded on the card to produce an output when said two areas are substantially equal.

* * * * *